June 28, 1966 B. C. COAD ET AL 3,257,703
COMPOSITE ELECTRODE MATERIALS, ARTICLES MADE THEREFROM
AND METHODS OF MAKING THE SAME
Filed Sept. 29, 1961
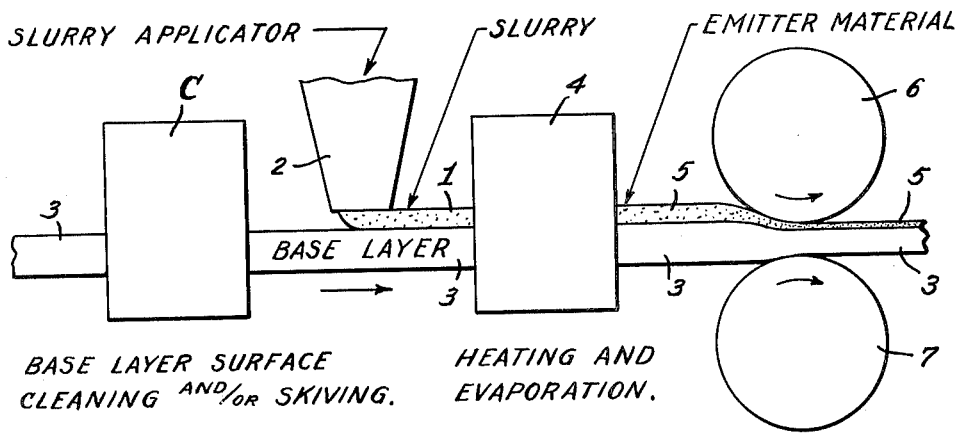
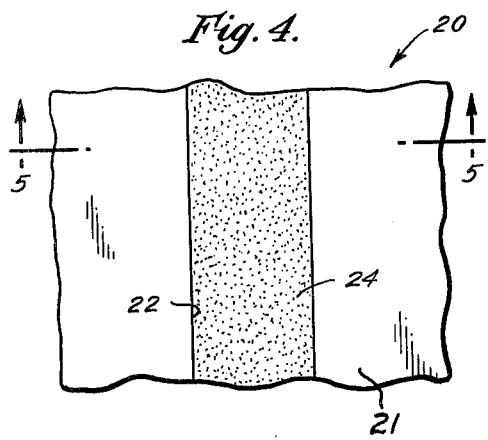
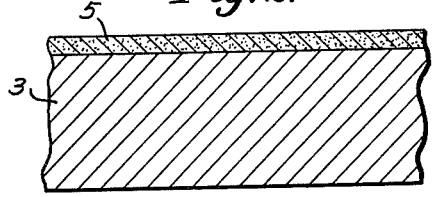
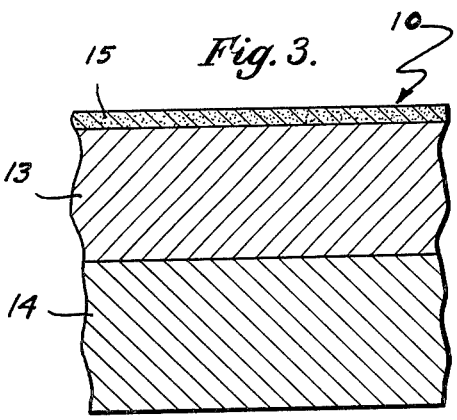
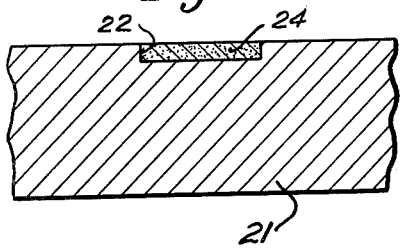
Inventors:
Brian C. Coad,
Bruce J. Bliss,
Joseph W. Waseleski, Jr.,
by Harold Levine Att'y.

3,257,703
COMPOSITE ELECTRODE MATERIALS, ARTICLES MADE THEREFROM AND METHODS OF MAKING THE SAME

Brian C. Coad, King's Norton, Birmingham, England, and Bruce J. Bliss, North Attleboro, and Joseph W. Waseleski, Jr., Foxboro, Mass., assignors to Texas Instruments Incorporated, Dallas, Tex., a corporation of Delaware Filed Sept. 29, 1961, Ser. No. 141,689
5 Claims. (Cl. 29—25.17)

This invention relates to composite electrodes, composite electrode materials and to methods of making the same.

It is one object of this invention to provide new and improved composite electrode materials and electrodes, such as cathodes, comprising a layer of a potentially electron emissive material, e.g. a carbonate, directly or autogenously bonded to a cathode metal base layer, and the provision of new and improved methods for making the same.

Another object of this invention is the provision of accurate, dependable and low-cost methods of making materials of the class described, which lend themselves well to continuous production of comparatively long lengths of the composite material.

It is another object of the present invention to provide for new and improved composite electrode materials having a layer of potentially electron emissive material of high density which is substantially free of undesirable organic impurities.

Among the further objects of this invention may be noted the provision of new and improved composite electrodes and materials therefor, and methods of making the same, wherein a potentially electron emissive material comprises a substantially uniform, solid, dense, and substantially nonporous coating which is tenaciously adhered and autogenously bonded to a base layer, and which composite materials are malleable and capable of substantial mechanical working, without causing deleterious damage to the potentially electron emissive layer or to the bond between the layers.

Other objects will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings, in which several of various possible embodiments of the invention are illustrated:

FIG. 1 is a diagrammatic view of a method according to the instant invention, showing emitter or potentially electron emissive material being deposited on a length of a cathode metal base layer and bonded thereto under the squeezing action of a pair of rolls;

FIG. 2 is a fragmentary, elevational, cross-sectional view of a composite material according to a first embodiment of this invention;

FIG. 3 is a fragmentary, elevational, cross-sectional view of a composite material according to a second embodiment;

FIG. 4 is a top plan view of a composite material according to a third embodiment; and FIG. 5 is a view taken on line 5—5 of FIG. 4.

Similar reference characters indicate corresponding parts throughout the several views of the drawings.

In the past, in the manufacture of composite or coated electrodes, such as cathodes, it has generally been the practice to either spray a coating capable of being rendered emissive on selected areas of a conductor or to deposit such coatings electrophoretically. Another method used in the past has been to spray a coating of material capable of being rendered emissive on a backing member which is later placed into contact with a chemically, pretreated, formed electrode member (e.g. such as a cathode sleeve). After contact of the treated or wetted sleeve with the backing member and coating, the backing member is removed. An example of this later process is disclosed in U.S. Patent 2,986,671. Each of these processes require that the cathode base layer be in a formed or fabricated condition, wherein the final desired configuration has been achieved prior to the coating operation. The exemplary prior commonly commercially practiced methods discussed above all have in common the disadvantage of requiring a binder (for example nitrocellulose) to achieve a suitable or satisfactory adherence between the potentially electron emissive material coating and the cathode metal base. Such organic binders, such as nitrocellulose as employed for example in the method of U.S. Patent 2,986,671 referred to above, provide for a source of possible contamination. When the binder is broken down at elevated temperatures to remove its presence, undesirable side products such as tars, gases, etc., which would deleteriously affect the thermionic emissive properties of the electrode can result if the binder is not driven off properly. Further, generally costly and closely controlled steps are required in driving off the binder to avoid creation of these deleterious side products. It has also been found that such potentially electron emissive coatings according to the exemplary prior methods mentioned above have limited densities generally not exceeding 35% of theoretical density. The present invention affords providing emissive coatings having densities which exceed 35% of theoretical density and can be as much as 95% of theoretical density. The present invention also contemplates the provision of electrode materials and electrodes wherein the potentially electron emissive material is directly bonded to the metal cathode base layer, which bonding does not require the use or presence of any binders, and wherein the base layer results in a dense cohered coating of substantially uniform thickness which is tenaciously adhered to the base layer. In contrast to prior methods, the composite electrode materials of the present invention are produced in continuous strip form and in unlimited lengths. The composite electrode materials according to the present invention can advantageously be mechanically worked and subjected to extreme forming and fabrication substantially without disrupting the bond between the layers or without creating flaking, or spalling of the potentially electron emissive material coating. The methods according to the present invention provide for precise thickness control permitting relatively thin coatings so that components made from these materials are advantageously adapted for miniaturization.

Referring now to the drawings, and particularly to FIG. 1, the method according to the instant invention generally comprises the steps of providing a malleable metal cathode base layer 3, which should have a bonding surface which is free of grease and bond deterring gross contaminants; disposing a layer of potentially electron emissive material in comminuted or particulate form against a clean surface of the base layer 3; and rolling the two together with a sufficient reduction to tenaciously bond the layers together.

The bond between the layers according to our invention, appears similar to the solid-phase bond for composite metals, such as described in the Boessenkool et al. U.S. Patent No. 2,691,815. That is, the bond between the layers according to the present invention, is accomplished substantially without a change of state of any of the components, e.g. a change in state from a solid to a liquid. The bond between layers is autogeneous and does not depend upon diffusion or chemical interaction between the layers or upon any intermediate binder material for its creation.

The significance of proper surface preparation of the base layer 3 is fully discussed in the U.S. Boessenkool et al. Patent No. 2,691,815 referred to above. Generally, intricate and involved surface preparation, such as that set forth in the Boessenkool U.S. patent referred to above, is not necessary. In most cases, the surface of the base layer 3 to be bonded is satisfactorily cleaned by scratch brushing or otherwise abrading, and sometimes, metal stock taken from the shelf can be bonded as it is by the methods of this invention. This is particularly true where the potentially emissive electron material coating is to be applied in the form of a stripe, such as that of material 20 shown in the embodiment of FIGS. 4 and 5, where the base layer bonding surfaces are relatively clean after skiving, as will be discussed in greater detail below.

The potentially electron emissive material 1, which will be discussed in terms of a carbonate material by way of example, may be deposited in comminuted form on the malleable metal cathode base layer 3 by any one of a number of known convenient means, which for example, include slurry applications, electrophoresis, dry powder deposits, gaseous deposition, vapor phase deposition, etc., the preferred form for carrying out the invention being a slurry application. A preferred slurry is made by suspending carbonate particles in a volatile organic fluid (i.e. isopropyl alcohol) and employing a wetting agent such as di-isopropyl amine to facilitate suspension of the carbonate in the organic fluid. The slurry mixture is then ball milled to render the mixture more uniform and to break up any existing carbonate agglomerates. The ball milling operation also advantageously reduces the carbonate particle size and renders the particle shape more irregular. It has been found that particle size and shape of the carbonate particles influences the quality of the bond between the carbonate and base layers. We have found that for optimum results, it is preferred that the carbonate particles do not exceed 100 mesh size and that the particle shape be irregular or random, rather than spheroidal.

The slurry method of applying the carbonate 1 to the base layer 3 is preferred because it affords the following advantages: (1) With the slurry, a very uniform coating of carbonate is afforded. (2) Close control of coating thickness is permitted by the slurry method. The thickness of coating can be controlled by varying the solid (carbonate content) in the slurry. (3) The slurry is advantageously adapted for the ball milling operation which provides desirable particle size and shape characteristics of the comminuted carbonate particle. (4) The slurry method permits a uniform mixture of various types of carbonate materials (e.g. mixtures of carbonates of barium, strontium and calcium, etc.).

The slurry, after being prepared in the preferred manner described above, is then deposited on the cathode metal base layer 3 in a convenient suitable method, such as for example, by painting, brushing, spraying, or roller coating, etc. The roller coating method, however, is preferred because it conveniently affords close thickness control.

Referring again to FIG. 1, the base layer 3 is fed through a means C which cleans and prepares the base layer surface for bonding to the carbonate layer. Means C can, for example, be an abrading tool, as discussed above, or a skiving tool to prepare a groove 22 in the base layer 21 for the product shown in FIGS. 4 and 5. The cleaned base layer 3 is then fed in the direction of the arrow shown in FIG. 1 past the slurry applicator which deposits a slurry coating of carbonate material 1 on the base layer. The base layer 3, carrying the slurry 1, is moved further in the direction of the arrow through a heating and evaporating means 4 (e.g. a furnace or heat lamps, etc.) to evaporate the organic fluid and wetting agent of the slurry to provide a uniform layer of dry carbonate material in comminuted form 5 on the base layer 3. A suitable example of a heating and evaporation step is one which is carried out at a temperature of 200° C. for a relatively short period of 30 seconds, or less.

The base layer and dry comminuted layer assembly is then further moved in the direction of the arrow in FIG. 1 between reduction rolls 6 and 7. The assembly is preferably rolled immediately after heating and evaporation between dry unlubricated reducing rolls so as to inhibit, or at least minimize, absorption of atmospheric moisture and mechanical damage and contamination of the assembly.

Layers 3 and 5 are squeezed together by rolls 6 and 7 with a sufficient reduction to autogenously and directly bond layers 5 and 3. The amount of reduction by rolling required to effect a bond or coherence between the dry carbonate particles and between the carbonate material and cathode metal base layer varies with the particular respective components, but this, of course, is readily determinable for any given set of components by actually reduction rolling the latter together. It has been found that for many combinations of materials, at least a 30% reduction is preferred to create a tenacious bond between the layers, as described above. It will be understood that with certain combinations of materials, less than a 30% reduction may be required to create a suitable bond between the layers 5 and 3. During the bonding steps the carbonate is not only bonded to the base layer, but the carbonate particles are bonded and cohered to each other to form a continuous, substantially non-porous, very dense, uniform layer of substantially uniform thickness. It has been found that the bonded layer of potentially electron emissive material made according to the present invention, can be provided with a density which exceeds or is greater than 35% of theoretical density which figure is generally the upper limit of densities afforded by the prior commonly commercially practiced methods discussed above. In carrying out the present invention, densities of as high as 95% of theoretical density for the bonded potentially electron emissive material layer have been accomplished. It has been found that optimum results are generally obtained when the density of the bonded potentially electron emissive layer exceeds 65% and ranges from 65% to 95% of theoretical density.

Although one of the advantages of the method according to the invention is that the total reduction by rolling to effect a bond between the layers may be carried out in a single pass or a single reduction step, it should be understood that if desired, the reduction step may be carried out with a plurality of successively cumulative reductions or passes. Where the carbonate is applied by methods other than the slurry application, the drying step illustrated by means 4 in FIG. 1 may, in some cases, be omitted. However, it should be noted that irrespective of the method employed for applying the carbonate to the carbon in particulate form, the carbonate material should preferably be in dry form for bonding to insure a resulting product of desired characteristics.

In FIG. 2 is shown a cross-sectional view of one product, which can be produced by the method diagrammatically illustrated in FIG. 1, and described above, which comprises a malleable metal cathode base layer 3 and a dense cohered carbonate layer 5 in particulate form bonded to layer 3.

Suitable examples of potentially electron emissive materials or materials which are capable of being rendered emissive, for carrying out the present invention, are carbonates of strontium, barium, calcium, lithium and thorium, and also mixtures consisting essentially of two or more of these carbonate materials. In carrying out the invention, carbonates of barium, strontium and calcium are preferred. An example of a double carbonate coating or cladding material mixture is 50%–65% by weight barium carbonate and the remainder strontium carbonate, the preferred mixture being 57.5% by weight barium carbonate and the remainder strontium carbonate. A suitable example of a triple carbonate mixture useful in carrying out the invention is 40%–65% by weight barium carbonate, up to 15% by weight calcium carbonate and the remainder strontium carbonate, the preferred mixture being 48% barium carbonate, 42% strontium carbonate and 10% calcium carbonate.

Nickel, titanium, tantalum and molybdenum, and alloys thereof, are examples of suitable materials for the cathode metal base layer, wherein said materials comprise the major alloying constituents. Nickel, titanium, tantalum and molybdenum are preferred as cathode metal base layers because of their excellent reducing properties, which are required for reaction with the carbonate coating to activate thermionic emission properties of the coating. The term "metal" as employed herein includes alloys.

A specific example of the invention, which has been made according to the FIG. 2 embodiment of the invention, is as follows:

Example I

A triple carbonate coating consisting essentially of 57.2% by weight of barium carbonate, 38.8% by weight of strontium carbonate and 4.0% by weight calcium carbonate has been bonded to a cathode metal base layer of active nickel of type 330. The material was bonded according to the preferred method described above and illustrated in FIG. 1. A strip of nickel approximately 0.02″ thick was cleaned by abrading one side, which side was coated with a slurry of 25% solid content, the solid content being the triple carbonate material mentioned above. The slurry composition was the preferred composition described above using isopropyl alcohol as the carrier. The unabraded surface was wiped clean and the composite was then subjected to a heating step to evaporate the alcohol and provide a layer of dry comminuted carbonate particles. Next the composite was passed through the rolling mill and received a 40% reduction in thickness to bond the layers together. The resulting bonded composite stock was then further rolled to a finished gauge of 0.0025″ in thickness. In rerolling the bonded composite stock to finished gauge, an annealing step intervened which was performed in a retort at 1300° F. for a period of approximately one-half of an hour in cracked ammonia. In the finished composite, the thickness of the carbonate layer ranged from 0.0002″ to 0.0003″. The resulting bonded material was capable of being bent 360° around a 0.050″ diameter wire substantially without flaking or peeling of the coating. The coating appeared smooth and uniform, with a substantially uniform thickness. An electrode formed from the resulting composite material was found to give stable emission over a test period of 2500 hours.

In FIG. 3 is shown another embodiment of a product according to the present invention, generally referred to by numeral 10. Material 10 is similar to the material shown in FIG. 2, except that the cathode metal base layer 3 is replaced by a composite or multi-layered cathode metal base layer, for example, comprising two layers 13 and 14. Layer 13 consists of a material selected from the group consisting of titanium, tantalum, molybdenum, nickel, and alloys thereof. Layer 14 may be formed of any one of a number of suitable metals selected in accordance with the requirements for the particular application.

Examples of combinations for layers 13 and 14, according to the FIG. 3 embodiment of the invention, are set forth in Table A below, in Examples I–III.

Table A

| Example | Layer 13 | Layer 14 |
|---|---|---|
| I | Nickel | Molybdenum. |
| II | Titanium | Molybdenum. |
| III | Nickel | Inconel. |

The material 10 is made in accordance with the methods described above for the material of FIG. 2. In this regard, base layer 3 would be constituted by a composite material comprising layers 13 and 14, which are metallurgically bonded together.

FIGS. 4 and 5 illustrate yet another product, generally referred to by numeral 20, which may be made in accordance with the present invention. Material 20 comprises a cathode metal base layer 21 having formed therein a longitudinally extending groove 22 and a stripe or layer of potentially electron emissive material 24 disposed in the groove and bonded to the base layer 21. Material 20 is generally made in accordance with the methods described above and diagrammatically illustrated in FIG. 1. In this regard, the step which is performed at means C, illustrated in FIG. 1, would be a skiving or groove 22 forming operation. The slurry is deposited in the groove and the dry particulate emitter or potentially electron emissive material 5 left, after leaving the heating and evaporation step at means 4, is disposed within the groove 22. The assembly is then passed between reducing rolls 6 and 7 to effect a sufficient reduction in thicknesses of the composite to tenaciously bond stripe 24 to layer 21. As noted above, the skived or machined groove 22 provides a relatively clean machined surface and generally obviates the necessity for any additional cleaning steps, if the potentially electron emissive material 24 is deposited in the groove 22 directly or immediately after the skiving operation at means C. The densities described above for the bonded electron emissive material layer in connection with the FIG. 2 product apply also to the FIGS. 3 and 4 products.

An advantage of the present invention is that electrode material can be produced with an electron emissive material layer having a greater weight per unit surface area for a given thickness of layer than that available by the conventional, commonly practiced methods described above. It will be understood that with the increased electron emissive layer densities afforded by the present invention, electrodes can be produced having comparable emission characteristics, with thinner emitter material layers than those produced by the conventional methods described above, thereby affording miniaturization of parts.

Further, the materials of the present invention advantageously lend themselves to less costly mass production fabrication techniques, wherein fabrication of the electrode cathode can be performed after the electron emissive layer has been bonded to the cathode metal base layer by mechanical working to the desired configuration.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

What is claimed is:

1. The method of making composite electrode material comprising the steps of providing a malleable metal cathode base layer; depositing a layer of a potentially electron emissive material in slurry form directly and only against said malleable base layer; said slurry comprising discrete particles of said potentially electron emissive material suspended in a volatile organic fluid; evaporating the organic fluid to provide a layer of dry potentially electron emissive material in comminuted form against said base layer; and squeezing said layers together with a sufficient reduction to form a dense, cohered layer of potentially electron emissive material bonded to said base layer.

2. The method as set forth in claim 1 and wherein said method is continuous, said squeezing step comprising a rolling step and the density of said bonded layer of potentially electron emissive material exceeding 35% of theoretical density.

3. The method for continuous production of composite cathode material comprising the steps of providing a malleable metal cathode base layer; cleaning, as by abrading, at least one surface of said malleable base layer to remove substantially all barrier films and gross contaminants to bonding; providing a slurry comprising a mixture of particles of potentially electron emissive material suspended in a volatile organic fluid; ball milling said mixture to render said mixture more uniform and to break apart existing agglomerates; coating said base layer directly and only with said slurry; subjecting the assembly to heating for a time sufficient to evaporate the volatile organic fluids of said slurry and to provide a layer of dry potentially electron emissive material in particulate form substantially free of organic chemical impurities and immediately after said evaporating step, rolling said dry layer of potentially electron emissive material and said base layer together between dry unlubricated rolls with a reduction sufficient to form a continuous dense, cohered layer of potentially electron emissive material bonded to said base layer wherein the density of said potentially electron emissive material layer ranges from 35% to 95% of theoretical density.

4. The method as set forth in claim 3 and wherein the density of said potentially electron emissive material layer ranges from 65% to 95% of theoretical density.

5. The method as set forth in claim 3 and including the step of mechanically working said bonded composite material into a cathode of desired configuration.

References Cited by the Examiner
UNITED STATES PATENTS

| | | | |
|---|---|---|---|
| 2,846,339 | 8/1958 | Dempsey | 117—223 |
| 2,895,854 | 7/1959 | La Rocque | 117—223 |
| 2,913,813 | 11/1959 | Homer et al. | 29—194 |
| 2,952,904 | 9/1960 | Hann | 29—194 |
| 3,005,926 | 10/1961 | Horner et al. | 313—346 |
| 3,031,740 | 5/1962 | Culbertson et al. | 313—346 X |
| 3,110,081 | 11/1963 | Hendriks | 313—346 X |

JOHN W. HUCKERT, *Primary Examiner.*

GEORGE N. WESTBY, DAVID J. GALVIN, *Examiners.*

L. ZALMAN, *Assistant Examiner.*